United States Patent
Gorsuch et al.

(10) Patent No.: US 11,858,665 B1
(45) Date of Patent: Jan. 2, 2024

(54) DEPLOYMENT MECHANISM WITH INTEGRAL ACTUATION DEVICE

(71) Applicant: Maxar Space LLC, Palo Alto, CA (US)

(72) Inventors: Jillian Gorsuch, Mountain View, CA (US); Gregory Dudder, Mountain View, CA (US)

(73) Assignee: Maxar Space LLC, Palo Alto, CA (US)

( * ) Notice: Subject to any disclaimer, the term of this patent is extended or adjusted under 35 U.S.C. 154(b) by 682 days.

(21) Appl. No.: 16/817,286

(22) Filed: Mar. 12, 2020

Related U.S. Application Data

(60) Provisional application No. 62/817,440, filed on Mar. 12, 2019.

(51) Int. Cl.
*B64G 1/22* (2006.01)

(52) U.S. Cl.
CPC .......... *B64G 1/222* (2013.01); *Y10T 403/342* (2015.01); *Y10T 403/459* (2015.01)

(58) Field of Classification Search
CPC .......... B64G 1/22; B64G 1/222; B64G 1/407; B64G 1/66; Y10T 403/34; Y10T 403/341; Y10T 403/342; Y10T 403/347; F16F 1/04
USPC ...................................... 244/172.6
See application file for complete search history.

(56) References Cited

U.S. PATENT DOCUMENTS

| | | | | |
|---|---|---|---|---|
| 4,155,524 A | * | 5/1979 | Marello | B64G 1/443 244/172.6 |
| 5,356,095 A | * | 10/1994 | Aker | B64G 1/222 244/172.6 |
| 6,260,798 B1 | * | 7/2001 | Casiez | B64C 3/56 244/172.6 |
| 9,306,254 B1 | | 4/2016 | Hovey et al. | |
| 9,562,616 B2 | * | 2/2017 | Strom | B22F 10/28 |
| 10,573,949 B2 | | 2/2020 | Fluitt et al. | |
| 11,014,303 B1 | | 5/2021 | Higham et al. | |
| 11,346,392 B1 | * | 5/2022 | Asad | F16C 11/12 |
| 2002/0073715 A1 | | 6/2002 | Logan et al. | |

(Continued)

FOREIGN PATENT DOCUMENTS

| | | | | |
|---|---|---|---|---|
| CN | 106356640 A | | 1/2017 | |
| CN | 106742084 A | * | 5/2017 | ............... B64G 1/66 |

(Continued)

OTHER PUBLICATIONS

U.S. Office Action dated Apr. 22, 2020 issued in U.S. Appl. No. 15/885,484.

(Continued)

*Primary Examiner* — Josh Skroupa
*Assistant Examiner* — Zachary A Hall
(74) *Attorney, Agent, or Firm* — Vierra Magen Marcus LLP

(57) ABSTRACT

An apparatus includes an integral, additively manufactured, actuation device having a rigid portion comprising a shaped structural member and a flexible portion comprising a helical torsion spring. In a spacecraft application, a spacecraft appendage may be coupled with a deployment mechanism, the deployment mechanism including at least one integral, additively manufactured, actuation device having a rigid portion comprising a shaped structural member and a flexible portion comprising a helical torsion spring.

13 Claims, 5 Drawing Sheets

(56) References Cited

U.S. PATENT DOCUMENTS

| | | | |
|---|---|---|---|
| 2005/0241801 | A1 | 11/2005 | Mitchell et al. |
| 2012/0303185 | A1 | 11/2012 | Munir et al. |
| 2015/0112472 | A1 | 4/2015 | Chen et al. |
| 2017/0029765 | A1 | 2/2017 | Vellinger et al. |
| 2017/0036783 | A1 | 2/2017 | Snyder |
| 2017/0157826 | A1 | 6/2017 | Hishiki |
| 2017/0200997 | A1 | 7/2017 | Gomberg |
| 2018/0015670 | A1 | 1/2018 | Gu et al. |
| 2022/0120325 | A1* | 4/2022 | Greenspan ............. F16F 1/021 |

FOREIGN PATENT DOCUMENTS

| | | | | |
|---|---|---|---|---|
| CN | 110217408 A * | 9/2019 | ............ | B64G 1/222 |
| KR | 20090081139 A * | 7/2009 | ............ | B64G 1/443 |
| WO | WO 2017/049367 A1 | 3/2017 | | |
| WO | WO 2017/059866 | 4/2017 | | |
| WO | WO 2017/079130 A1 | 5/2017 | | |
| WO | WO 2018/029455 A1 | 2/2018 | | |

OTHER PUBLICATIONS

U.S. Notice of Allowance dated Oct. 23, 2019 issued in U.S. Appl. No. 15/818,542.

U.S. Notice of Allowance (Corrected) dated Jan. 2, 2020 issued in U.S. Appl. No. 15/818,542.

U.S. Office Action dated May 9, 2019 issued in U.S. Appl. No. 15/818,542.

Extended European Search Report dated Dec. 19, 2018 issued in EP Application No. 18185270.8.

European Office Action dated Mar. 2, 2020 issued in EP Application No. 18185270.8.

Booth, P. et al., "Enhancements to satellite feed chain performance, testing and lead-times using additive manufacturing," Airbus Defence and Space Ltd. 10th European Conference on Antennas and Propagation (EuCAP), Apr. 10-15, 2016, 5 pages.

Booth, P. et al., "Using additive manufacturing for feed chain and other passive microwave components," Airbus Defence and Space Ltd., 11th European Conference on Antennas and Propagation (EUCAP), 2017, 5 pages.

Dimitriadis et al., "Polymer-Based Additive Manufacturing of High-Performance Waveguide and Antenna Components," Proceedings of the IEEE, vol. 105. No. 4., Apr. 1, 2017, XP055532388, pp. 668-676.

Dunn, JJ, et al., "3D Printing in Space: Enabling New Markets and Accelerating the Growth of Orbital Infrastructure," Made in Space, Inc Space Manufacturing 14: Critical Technologies for Space Settlement Space Studies Institute, Oct. 29-31, 2010, 14 pages.

Peverini, O.A. et al., "Selective laser melting manufacturing of microwave waveguide devices," National Research Council of Italy, Turin, Italy, Proceedings of the IEEE, 2016, 12 pages.

Thornton, J. et al., "Additive Manufacturing of Waveguide for Ku-band Satellite Communications Antenna", European Conference on Antennas and Propagation (EuCAP), Davos, Switzerland, Apr. 10-15, 2016, 4 pages.

Werkheiser, N., "Overview of NASA Initiatives in 3D Printing and Additive Manufacturing," Marshall Space Flighter Center, National Aeronautics and Space Administration 2014 DoD Maintenance Symposium, Birmingham, AL Nov. 17-20, 2014, 28 pages.

U.S. Appl. No. 15/885,484, filed Jan. 31, 2018, Higham et al.

U.S. Non-Final office Action dated Jul. 6, 2022 in U.S. Appl. No. 17/234,664.

U.S. Final Office Action dated Aug. 20, 2020 issued in U.S. Appl. No. 15/885,484.

U.S. Notice of Allowance dated Oct. 26, 2022 in U.S. Appl. No. 17/234,664.

U.S. Notice of Allowance dated Jan. 25, 2021 issued in U.S. Appl. No. 15/885,484.

U.S. Appl. No. 17/234,664, Inventors Higham et al. filed Apr. 19, 2021.

* cited by examiner

DEPLOYMENT MECHANISM WITH INTEGRAL ACTUATION DEVICE

PRIORITY DATA

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

This invention relates generally to a deployment mechanism, and more particularly to a deployment mechanism that includes an integral, additively manufactured, actuation device having a shaped structural member and a torsion spring.

BACKGROUND OF THE INVENTION

The assignee of the present invention manufactures and deploys spacecraft for, inter alia, communications and broadcast services. Such spacecraft generally include a number of appendages such as solar array panels and antenna reflectors that are reconfigured from a launch configuration to an on orbit configuration using deployment mechanisms. Known deployment mechanisms, whether passive or motor driven, often include a number of springs, tensioning wires, hinges, dampers, as well as underlying structural components. As a result, such deployment mechanisms present a significant cost and reliability burden to the spacecraft design.

Accordingly, there is a need for improved deployment mechanisms for deploying or otherwise reconfiguring the spacecraft appendages.

SUMMARY

According to some implementations, an apparatus, includes an integral, additively manufactured, actuation device having a rigid portion comprising a shaped structural member and a flexible portion comprising a helical torsion spring.

In some examples, a proximal end of the torsion spring may extend from a wall of the rigid portion and a distal portion of the torsion spring may be flexibly disposed with respect to the rigid portion. In some examples, the distal portion may include a coupling feature. In some examples, the coupling feature may include a threaded or press fit interface configured to mate with a spacecraft appendage.

In some examples, the actuation device may be configured as a coupling node having a plurality of legs, the shaped structural member being one of the plurality of legs.

In some examples, the shaped structural member may be a thin-walled tube. In some examples, the thin-walled tube has a circular cross-section.

In some examples, the actuation device may be formed from a polymeric or metallic material.

In some examples, each of a proximal end of the torsion spring and a distal end of the torsion spring may extend from a wall of the rigid portion and a central portion of the torsion spring is flexibly disposed with respect to the rigid portion. In some examples, the central portion may include a coupling feature. In some examples, the coupling feature may include a threaded or press fit interface for mating to a spacecraft appendage.

According to some implementations, a spacecraft, includes a spacecraft appendage and a deployment mechanism connected to the spacecraft appendage, the deployment mechanism including at least one integral, additively manufactured, actuation device having a rigid portion comprising a shaped structural member and a flexible portion comprising a helical torsion spring.

In some examples, a proximal end of the torsion spring may extend from a wall of the rigid portion and a distal portion of the torsion spring may be flexibly disposed with respect to the rigid portion. In some examples, the distal portion may include a coupling feature and the deployment mechanism may be connected to the spacecraft appendage by way of the coupling feature. In some examples, the coupling feature may include a threaded or press fit interface for mating to the spacecraft appendage.

In some examples, the actuation device may be configured as a coupling node having a plurality of legs, the shaped structural member being one of the plurality of legs.

In some examples, the shaped structural member may be a thin-walled tube having a circular cross-section.

In some examples, the actuation device may be formed from a polymeric or metallic material.

In some examples, each of a proximal end of the torsion spring and a distal end of the torsion spring may extend from a wall of the rigid portion and a central portion of the torsion spring may be flexibly disposed with respect to the rigid portion. In some examples, the central portion includes a coupling feature. In some examples, the coupling feature includes a threaded or press fit interface for mating to the spacecraft appendage.

BRIEF DESCRIPTION OF THE DRAWINGS

Features of the invention are more fully disclosed in the following detailed description of the preferred embodiments, reference being had to the accompanying drawings, in which.

Figure 1:
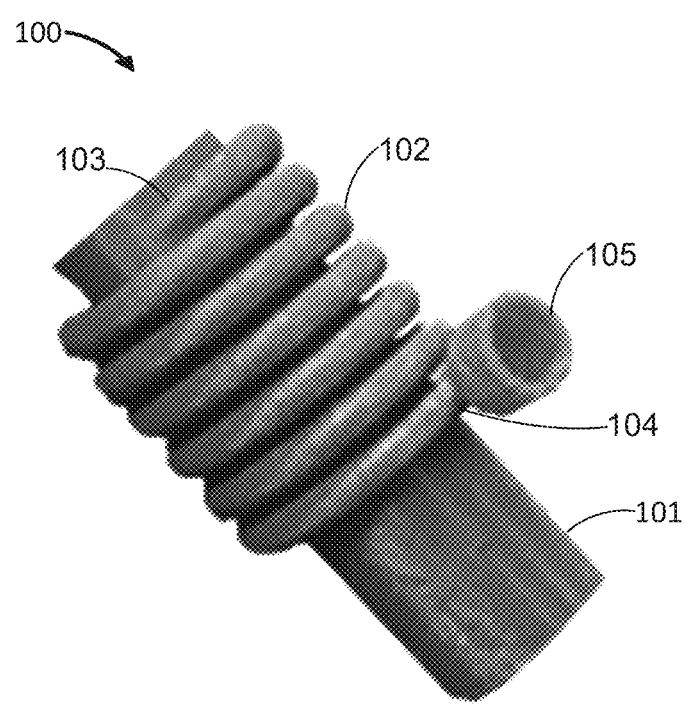
FIG. 1 illustrates an example of an actuation device in accordance with an implementation.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when a feature is referred to as being "connected" or "coupled" to another feature, it can be directly connected or coupled to the other feature, or intervening features may be present. Furthermore, "connected" or "coupled" as used herein may include wirelessly connected or coupled. It will be understood that although the terms "first" and "second" are used herein to describe various features, these features should not be limited by these terms. These terms are used only to distinguish one feature from another feature. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

The terms "spacecraft", "satellite" and "vehicle" may be used interchangeably herein, and generally refer to any orbiting satellite or spacecraft system.

The present disclosure relates to an integral actuation device for a deployment mechanism. Advantageously, the device may be an additively manufactured component having a rigid portion and a flexible portion. The rigid portion may be configured as a structural member and the flexible portion may be configured as a torsion spring. At least a first end of the torsion spring extends from a wall of the rigid portion. In some implementations, a proximal end of the torsion spring extends from a wall of the rigid portion and a distal portion end of torsion spring is flexibly disposed with respect to the rigid portion. In other implementations, both a proximal end and a distal second end of the torsion spring extend from respective regions of the wall of the rigid portion while a central portion of the torsion spring disposed between the proximal end and the distal end are flexibly disposed with respect to the rigid portion.

FIG. 1 illustrates an example of an actuation device in accordance with an implementation. The actuation device 100 is, advantageously, an integral, additively manufactured component. The actuation device 100 may be formed from a polymeric or metallic material, for example. In the illustrated example, the actuation device 100 includes a shaped structural member 101. In some implementations, the structural member 101 may be a thin-walled tube. In the illustrated example, the thin-walled tube has a circular cross-section, but an oval, elliptical or polygonal cross-section may be contemplated by the present disclosure. The actuation device 100 also includes a flexible portion 102 that may be configured to operate as a helical torsion spring. A proximal end 103 of the flexible portion 102 extends from the rigid member 101. A distal end 104 of the flexible portion 102 is movable with respect to the rigid member 101. More particularly, application of a force to the distal end 104 may compress or expand ("load") the torsion spring with respect to a rest position.

In the illustrated implementation, the actuation device 100 also includes a coupling feature 105 disposed proximate to the distal end 104 of the flexible portion 102. Advantageously, the coupling feature 105 may be an integral, additively manufactured feature of the actuation device 100. As described in further detail hereinbelow, the coupling feature 105 may be configured to facilitate a threaded or press fit interface with a coupling interface of a spacecraft appendage to be deployed (not illustrated). In some implementations, for example, the coupling feature 105 may be configured with a press fit characteristic, such that the coupling feature 105 may be compressed slightly in order to reduce its outer diameter to pass through a corresponding hole in the coupling interface of the spacecraft appendage.

Figure 2:
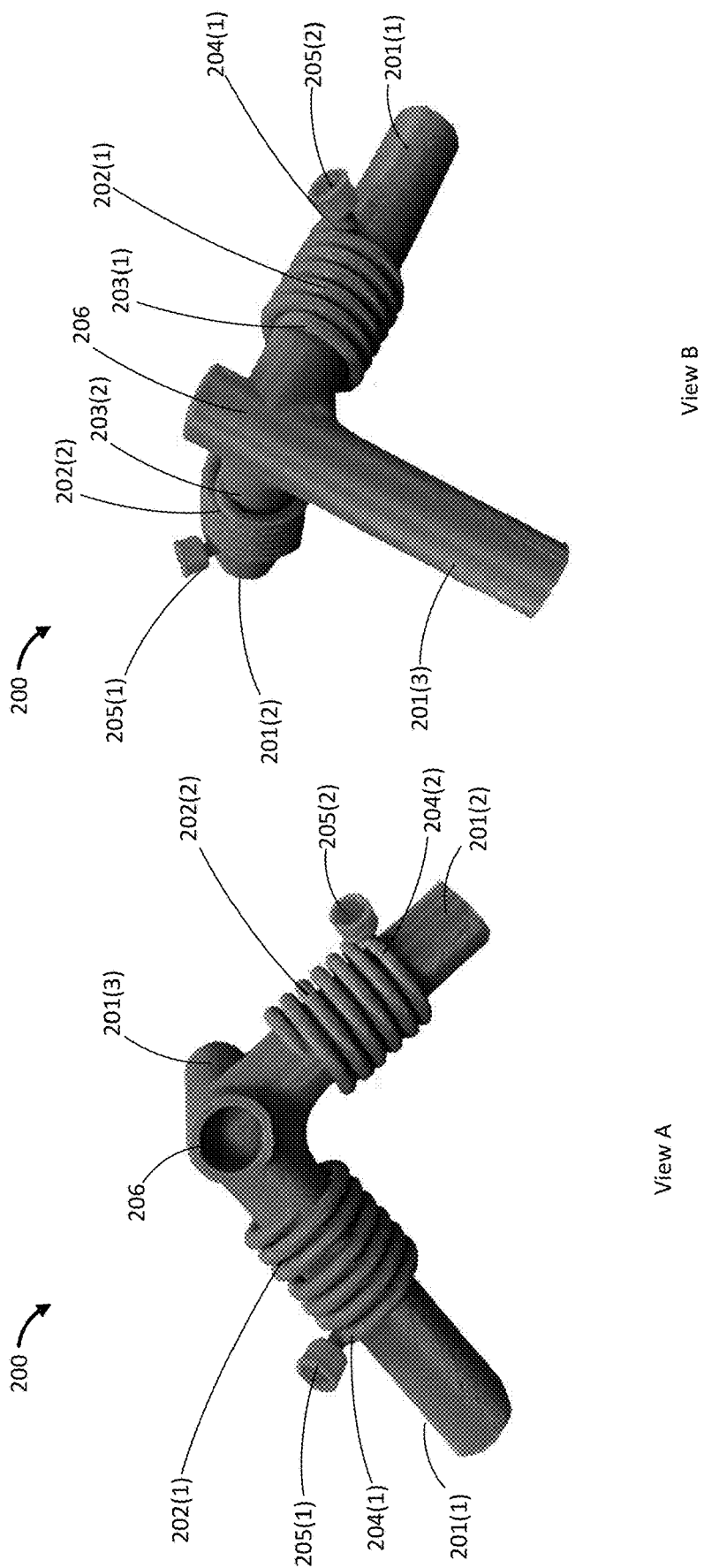
FIG. 2 illustrates two views of an actuation device according to a further implementation.

FIG. 2 illustrates two views of an actuation device according to a further implementation. The actuation device 200 may be regarded as a three-legged corner fitting, or coupling node, that includes a rigid portion that is configured to include three rigid members (legs), 201(1), 201(2) and 201(3), extending outward from a common central region 206. In the illustrated example, the actuation device 200 includes two flexible portions, 202(1) and 202(2), each flexible portion being associated with a respective structural member and configured to operate as helical torsion spring (deployment coil). A proximal end 203(1) of the flexible portion 202(1) extends from the rigid member 201(1). Similarly, a proximal end 203(2) of the flexible portion 202(2) extends from the rigid member 201(2). As described above in connection with FIG. 1, a distal end 204(i) of each flexible portion is movable with respect to a respective rigid member 201(i). Moreover, the actuation device 200 also includes a coupling feature 205(i) disposed proximate to the distal end 204(i) of each flexible portion 202(i). Advantageously, the coupling features 205(i) may be integral, additively manufactured, features of the actuation device 200.

In the example of FIG. 2, the actuation device is configured to have three legs, of which each of two legs has an associated torsion spring. Actuation devices having two, four or more legs, of which one or more have an associated torsion spring, are also contemplated by the present disclosure.

Figure 3:
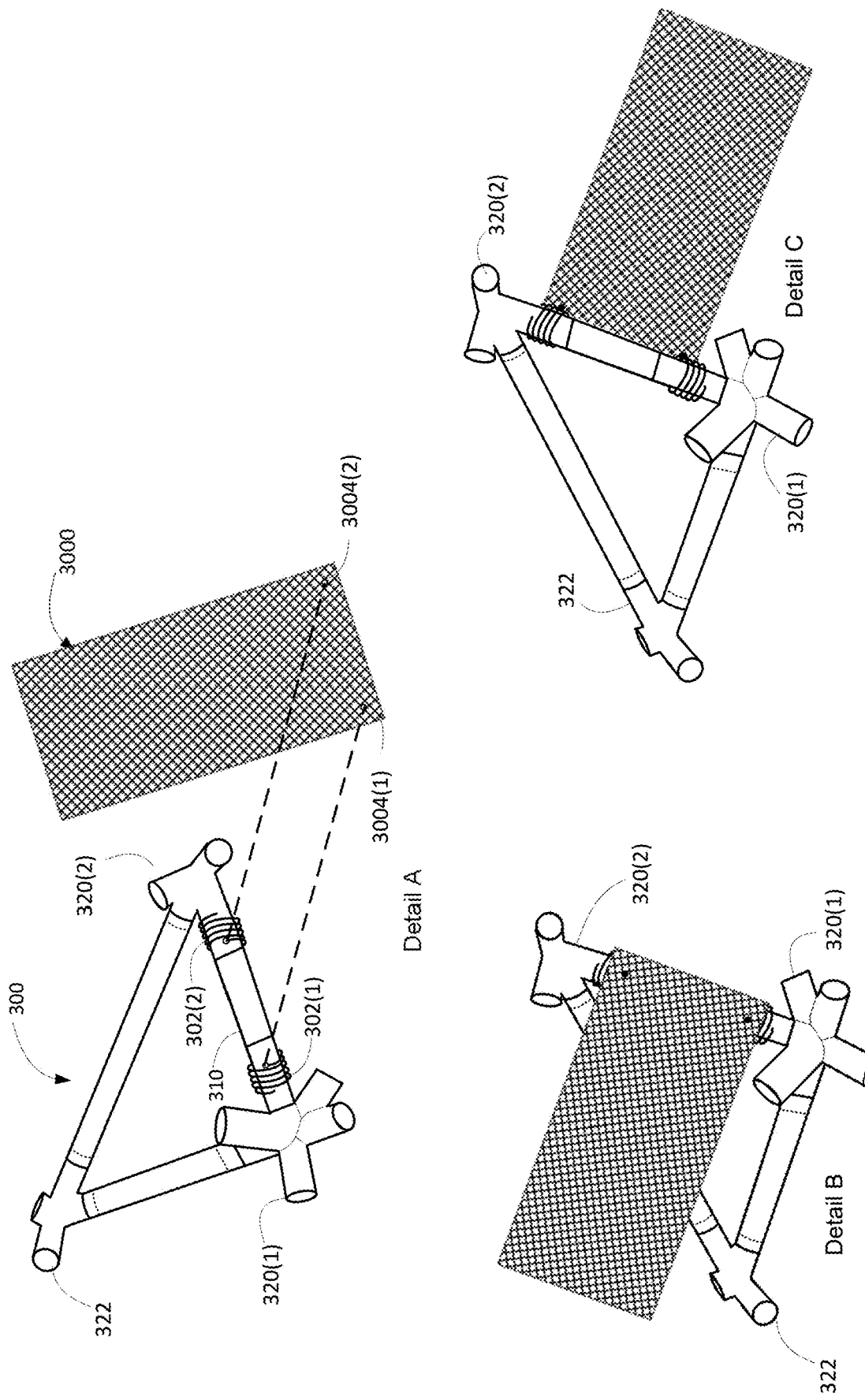
FIG. 3 illustrates a deployment mechanism, according to an implementation.

FIG. 3 illustrates a deployment mechanism, according to an implementation. In the illustrated implementation, a deployment mechanism 300 includes two actuation devices, 320(1) and 320(2) and a coupling node 322. The deployment mechanism 300 may be configured as (or as part of) a closed truss structure form fabricated using one or more the techniques disclosed in U.S. Pat. No. 10,227,145, assigned to the assignee of the present invention, the disclosure of which is hereby incorporated by reference in its entirety into the present application. In the illustrated example, actuation devices, 320(1) and 320(2) are mechanically coupled by way of a strut element 310 and include, respectively, associated torsional springs 302(1) and 302(2). A spacecraft appendage 3000 may be coupled with the deployment mechanism 300 by way of respective distal ends of the torsional springs 302(1) and 302(2). An exploded view of such an arrangement is shown in Detail A. As described in more detail hereinbelow, the distal end of each of the torsional springs 302(1) and 302(2) include a press fit assembly that engages with a respective coupling insert 3004(1) and 3004(2) of the spacecraft appendage 3000. Detail B and Detail C illustrate, respectively, a stowed and a deployed configuration of the assembly of the spacecraft appendage 3000 with the deployment mechanism 300.

Advantageously, the actuation devices 320(1) and 320(2) may be configured to provide for controlled deployment of appendage 3000 to a predefined angle. In the stowed configuration (Detail B) the appendage 3000 may be secured by a releasable hold-down device (not illustrated) in a position that causes a torsional pre-load of the torsional springs 302(1) and 302(2). When the hold-down device is released, deployment of the panel may be passively driven by the springs 302(1) and 302(2) relieving the torsional pre-load.

Figure 4:
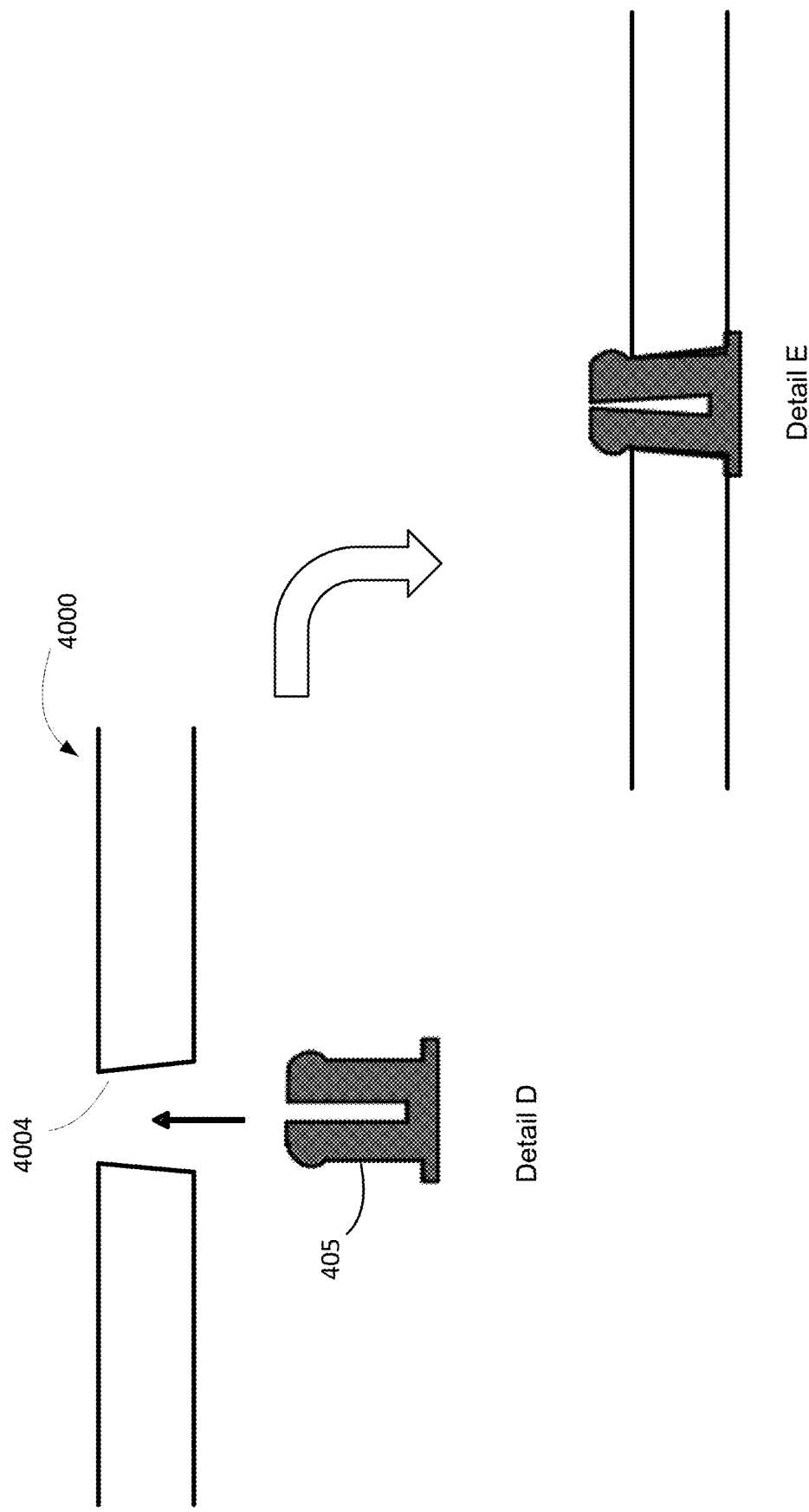
FIG. 4 illustrates an example of a coupling feature of a torsion spring engaging with coupling inserts of a spacecraft appendage.

FIG. 4 illustrates an example of a coupling feature of a torsion spring engaging with coupling inserts of a spacecraft appendage 4000. Referring first to Detail D, in the illustrated example, the coupling feature 405 may be configured as a press fit arrangement disposed at or near the distal end of a torsion spring (not illustrated). The coupling feature 405 may be configured to engage with walls of a mating coupling interface 4004. Such an arrangement may allow quick assembly where, in the illustrated example, the coupling feature 405 is configured as a male press fit arrangement that engages with the mating coupling interface 4004, which is configured as a complementary female press fit interface of the spacecraft appendage 4000. As may be observed in Detail E, a centerline relief provides space for a compressive deformation of the coupling feature 405 while a top lip portion is configured to prevent inadvertent retraction of the coupling feature 405 after engagement with the coupling interface 4004.

Referring again to FIG. 2, in some implementations, one or all of the legs 201(1), 201(2) and 201(3) may have different lengths. As a result, an actuation device 200 may be asymmetrical and facilitate assembly into a closed form truss structure as described in U.S. Pat. No. 10,227,145. Advantageously, two actuation devices 200 may be mutually complementary. As a result, in configurations where, as in the illustrated example, 201(1), 201(2) and 201(3) are mutually orthogonal, a four-corner rectangular deployment mechanism may be contemplated where each of the four corners is formed from an identical actuation device 200. Alternatively, more complex geometric shapes can be realized by altering the angle between the legs. For example, a "soccer ball" arrangement that includes twelve pentagonal and twenty hexagonal faces can be fabricated utilizing just two different designs.

It will be appreciated that dimensions of deployment device 200 may be scaled to accommodate various spacecraft requirements for loading, dynamic response, deployment angle, size, and shape.

Figure 5:
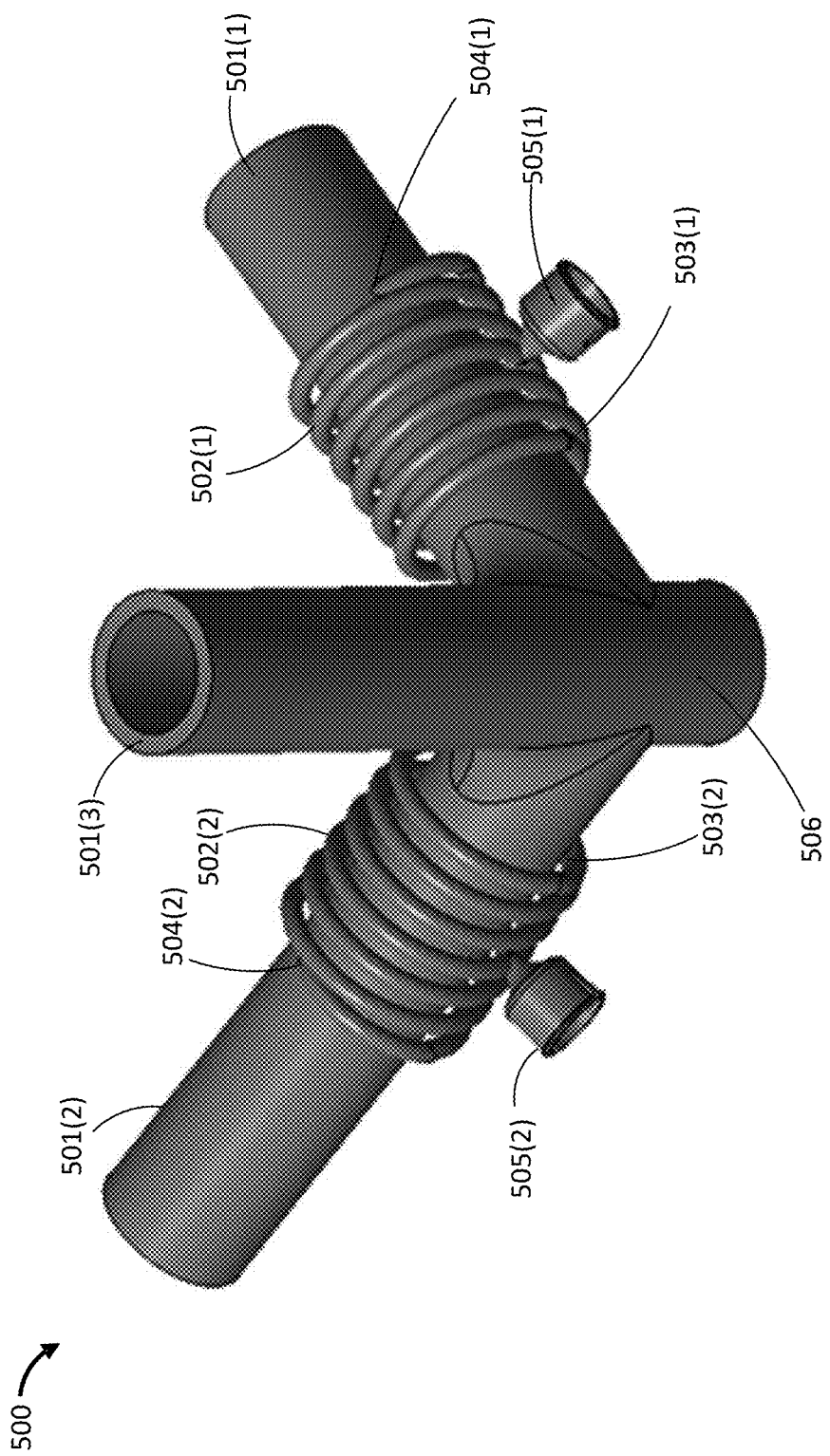
FIG. 5 illustrates a view of an actuation device according to a further implementation.

FIG. 5 illustrates a view of an actuation device according to a further implementation. Similarly to the actuation device 200 described above in connection with FIG. 2, the actuation device 500 may be regarded as a three-legged corner fitting, or coupling node, that includes a rigid portion that is configured to include three shaped structural members (legs), 501(1), 501(2) and 501(3), extending outward from a common central region 506. In the illustrated example, the actuation device 500 includes two flexible portions, 502(1) and 502(2), each flexible portion being associated with a respective member and configured to operate as helical torsion spring (deployment coil). A proximal end 503(1) and a distal end 504(1) of the flexible portion 502(1) extends from the rigid member 501(1). Similarly, a proximal end 503(2) and a distal portion 504(2) of the flexible portion 502(2) extend from the rigid member 501(2). The actuation device 500 includes a coupling feature 505(i) that is disposed between the proximal end 503(i) and the distal end 504(i) of each flexible portion 502(i). Advantageously, the coupling features 505(i) may be integral, additively manufactured, features of the actuation device 500.

In addition to providing torque for deployment of an appendage, it is contemplated that the deployment device 200 may include one or more damping features. For example, additional torsion springs (not illustrated) may be configured to provide passive damping for the deployment mechanism. For example, one or more mirrored helicoil springs may be configured for this purpose. Alternatively or in addition, a portion of one or more legs may be configured to include a passive dampening feature to help reduce overall dynamic loading to the spacecraft and subassemblies Thus, a deployment mechanism that includes an integral, additively manufactured, actuation device having a shaped structural member and a torsion spring has been disclosed. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. An apparatus, comprising an integral, additively manufactured, actuation device having a rigid portion comprising a shaped structural member and a flexible portion comprising a helical torsion spring, wherein:
   each of a proximal end of the torsion spring and a distal end of the torsion spring extend from a wall of the rigid portion and a central portion of the torsion spring is flexibly disposed with respect to the rigid portion; and
   the central portion includes a coupling feature that includes a threaded or press fit interface for mating to a spacecraft appendage.

2. The apparatus of claim 1, wherein the proximal end of the torsion spring extends from the wall of the rigid portion and the distal portion of the torsion spring is flexibly disposed with respect to the rigid portion.

3. The apparatus of claim 2, wherein the distal portion includes the coupling feature.

4. The apparatus of claim 1, wherein the actuation device is configured as a coupling node having a plurality of legs, the shaped structural member being one of the plurality of legs.

5. The apparatus of claim 1, wherein the shaped structural member is a tube.

6. The apparatus of claim 5, wherein the tube has a circular cross-section.

7. The apparatus of claim 1, wherein the actuation device is formed from a polymeric or metallic material.

8. A spacecraft, comprising:
   a spacecraft appendage; and
   a deployment mechanism connected to the spacecraft appendage, the deployment mechanism including at least one integral, additively manufactured, actuation device having a rigid portion comprising a shaped structural member and a flexible portion comprising a helical torsion spring, wherein:
   each of a proximal end of the torsion spring and a distal end of the torsion spring extend from a wall of the rigid portion and a central portion of the torsion spring is flexibly disposed with respect to the rigid portion; and
   the central portion includes a coupling feature that includes a threaded or press fit interface for mating to a spacecraft appendage.

9. The spacecraft of claim 8, wherein the proximal end of the torsion spring extends from the wall of the rigid portion and the distal portion of the torsion spring is flexibly disposed with respect to the rigid portion.

10. The spacecraft of claim 9, wherein the distal portion includes the coupling feature and the deployment mechanism is connected to the spacecraft appendage by way of the coupling feature.

11. The spacecraft of claim 8, wherein the actuation device is configured as a coupling node having a plurality of legs, the shaped structural member being one of the plurality of legs.

12. The spacecraft of claim 8, wherein the shaped structural member is a tube having a circular cross-section.

13. The spacecraft of claim 8, wherein the actuation device is formed from a polymeric or metallic material.

\* \* \* \* \*